(12) United States Patent
Jaradi et al.

(10) Patent No.: US 11,332,093 B2
(45) Date of Patent: May 17, 2022

(54) AIRBAG EXTENDING ANNULARLY AROUND ROTATIONAL AXIS OF STEERING WHEEL

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 26 days.

(21) Appl. No.: 16/834,151

(22) Filed: Mar. 30, 2020

(65) Prior Publication Data

US 2021/0300280 A1    Sep. 30, 2021

(51) Int. Cl.
*B60R 21/203*    (2006.01)
*B60R 21/231*    (2011.01)
*B60R 21/00*    (2006.01)

(52) U.S. Cl.
CPC .......... *B60R 21/203* (2013.01); *B60R 21/231* (2013.01); *B60R 2021/0051* (2013.01);
(Continued)

(58) Field of Classification Search
CPC ................ B60R 21/203; B60R 21/231; B60R 2021/0051; B60R 2021/23169;
(Continued)

(56) References Cited

U.S. PATENT DOCUMENTS 3,370,886 A * 2/1968 Frost .................... B60R 22/28
                                                              280/730.1
3,618,979 A * 11/1971 Gulette .............. B60R 21/231
                                                              280/731

(Continued)

FOREIGN PATENT DOCUMENTS

JP        H1124579 A         1/1999
JP     2004175150 A    *    6/2004
JP        4613913 B2         1/2011

OTHER PUBLICATIONS

"In any event" entry in the Merriam-Webster Thesaurus; https://www.merriam-webster.com/thesaurus/in%20any%20event; Oct. 4, 2021.*

*Primary Examiner* — Keith J Frisby
(74) *Attorney, Agent, or Firm* — Frank A. MacKenzie; Bejin Bieneman PLC

(57) ABSTRACT

An assembly includes a steering wheel having a hub rotatable about a rotational axis and a rim spaced radially from the hub. The assembly includes a first airbag supported by the hub and inflatable from an uninflated position to an inflated position. The assembly includes a second airbag inflatable from an uninflated position to an inflated position. The second airbag extending annularly around the rotational axis. The first airbag and the second airbag being spaced from each other along the rotational axis when the first airbag and the second airbag are in the uninflated position. The rim being between the first airbag and the second airbag when the first airbag and the second airbag are in the inflated position.

14 Claims, 6 Drawing Sheets

(52) U.S. Cl.
CPC .............. *B60R 2021/23107* (2013.01); *B60R 2021/23169* (2013.01)

(58) Field of Classification Search
CPC .. B60R 2021/23107; B60R 2021/0004; B60R 2021/0044; B60R 2021/0048; B60R 2021/0053
USPC ........................................................ 280/731
See application file for complete search history.

(56) References Cited

U.S. PATENT DOCUMENTS

| | | | |
|---|---|---|---|
| 3,784,223 A * | 1/1974 | Hass ................... | B60R 21/2032 280/730.1 |
| 5,190,313 A * | 3/1993 | Hickling ............... | B60R 21/233 244/121 |
| 5,240,283 A * | 8/1993 | Kishi ..................... | B60R 21/233 280/729 |
| 5,529,337 A | 6/1996 | Takeda et al. | |
| 5,556,056 A | 9/1996 | Kalberer et al. | |
| 5,558,300 A * | 9/1996 | Kalberer ................ | B60R 21/09 244/118.5 |
| 6,712,384 B2 * | 3/2004 | Abe ....................... | B60R 21/231 280/730.1 |
| 9,758,121 B2 | 9/2017 | Paxton et al. | |
| 2002/0113416 A1 * | 8/2002 | Uchida ................. | B60R 21/233 280/729 |
| 2003/0116945 A1 * | 6/2003 | Abe ....................... | B60R 21/231 280/729 |
| 2004/0026909 A1 * | 2/2004 | Rensinghoff ......... | B60R 21/231 280/732 |
| 2006/0197324 A1 * | 9/2006 | Klinkenberger ...... | B60R 21/203 280/731 |
| 2006/0232050 A1 * | 10/2006 | Kumagai ............... | B60R 21/231 280/730.1 |
| 2016/0244016 A1 * | 8/2016 | Takeshita .............. | B60R 21/231 |
| 2019/0161044 A1 | 5/2019 | Schneider | |
| 2019/0256032 A1 | 8/2019 | Faruque et al. | |
| 2021/0046893 A1 * | 2/2021 | Rosenberg ............. | B60R 21/08 |

* cited by examiner

AIRBAG EXTENDING ANNULARLY AROUND ROTATIONAL AXIS OF STEERING WHEEL

BACKGROUND

Vehicles are equipped with airbags. In the event of an impact, an inflator activates and provides inflation medium to the airbags, and the airbags pressurize and act as supplemental restraints for occupants during the impact. The airbags are located at various fixed positions in passenger cabins of vehicles. Vehicles typically include a driver airbag mounted in the steering wheel. Upon inflation, a rim of the steering wheel may act as a reaction surface for the driver airbag.

DETAILED DESCRIPTION

Figure 1:
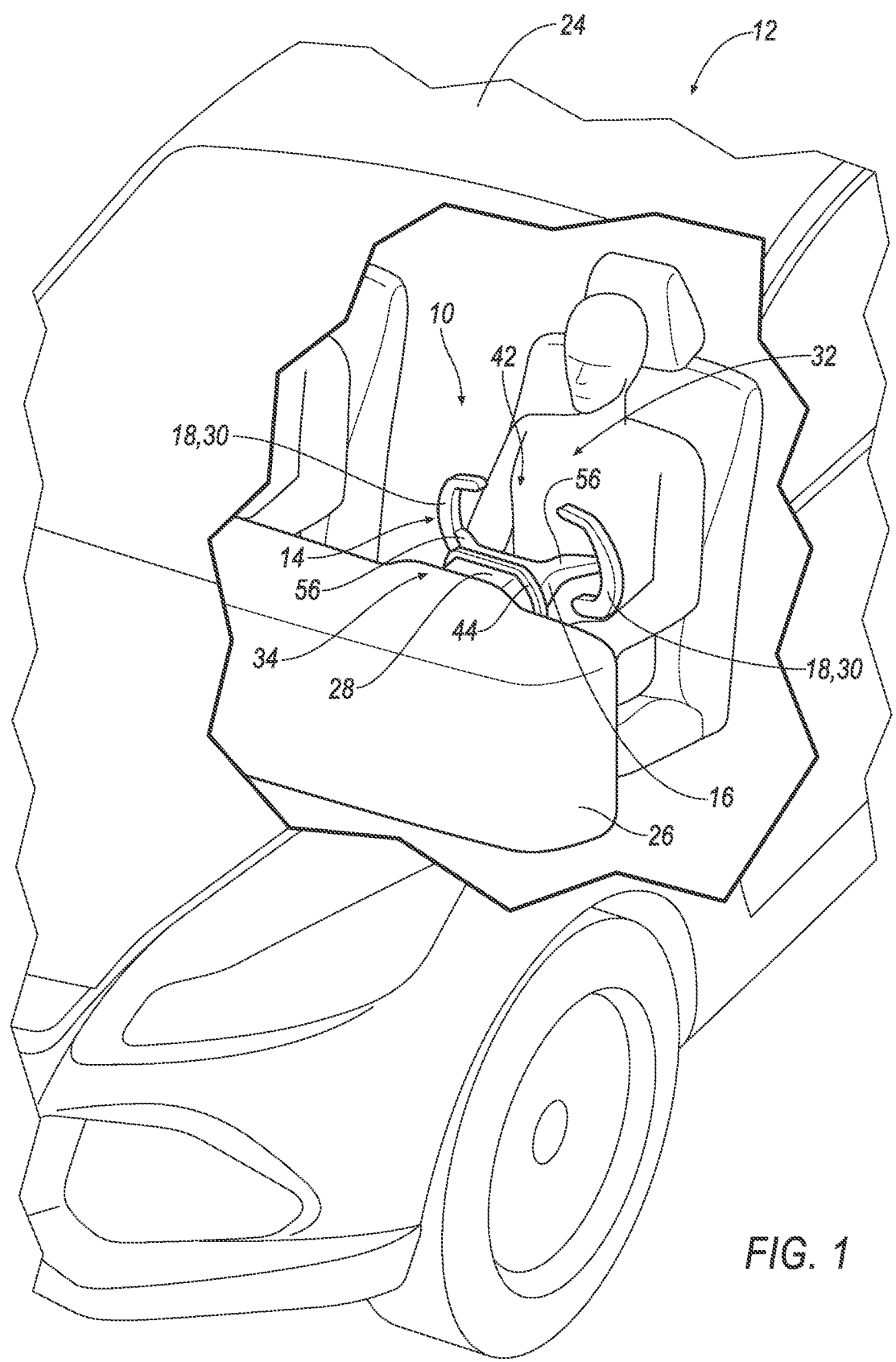
FIG. 1 is a perspective view of a vehicle including an assembly having a first airbag supported by a steering wheel and a second airbag that is vehicle-forward of the first airbag with both airbags in an uninflated position.

An assembly includes a steering wheel having a hub rotatable about a rotational axis and a rim spaced radially from the hub. The assembly includes a first airbag supported by the hub and inflatable from an uninflated position to an inflated position. The assembly includes a second airbag inflatable from an uninflated position to an inflated position. The second airbag extending annularly around the rotational axis. The first airbag and the second airbag being spaced from each other along the rotational axis when the first airbag and the second airbag are in the uninflated position. The rim being between the first airbag and the second airbag when the first airbag and the second airbag are in the inflated position.

The second airbag may be supported by the hub.

The first airbag and the second airbag may abut each other when the first airbag and the second airbag are in the inflated position.

The first airbag and the second airbag may abut the rim when the first airbag and the second airbag are in the inflated position.

The second airbag may be vehicle-forward of the first airbag.

The first airbag and the second airbag may be fluidly isolated from each other.

The second airbag may extend radially outward relative to the rotational axis farther than the first airbag in the inflated position.

The assembly may include an instrument panel. The second airbag may be between the instrument panel and the first airbag.

The second airbag may abut the instrument panel when the second airbag is in the inflated position.

The rim of the steering wheel may be non-circular.

The rim may include a pair of paddles separated by a gap. The first airbag and the second airbag may abut each other in the gap when the first airbag and the second airbag are in the inflated position.

The assembly may include an instrument panel. The second airbag, when the first airbag and the second airbag are in the inflated position, may be between the instrument panel and the first airbag and abutting the instrument panel.

The second airbag may include a generally cylindrical cavity extending from the hub to the second airbag.

The assembly may include a pair of arms extending from the hub to the rim, the arms being between the first airbag and the second airbag when the first airbag and the second airbag are in the inflated position.

With reference to the Figures, wherein like numerals indicate like parts throughout the several views, an assembly 10 for a vehicle 12 includes a steering wheel 14 having a hub 16 rotatable about a rotational axis A and a rim 18 spaced radially from the hub 16. A first airbag 20 is supported by the hub 16 and inflatable from an uninflated position to an inflated position. A second airbag 22 is inflatable from an uninflated position to an inflated position. The second airbag 22 extends annularly around the rotational axis A. The first airbag 20 and the second airbag 22 are spaced from each other along the rotational axis A when the first airbag 20 and the second airbag 22 are in the uninflated position. The rim 18 is between the first airbag 20 and the second airbag 22 when the first airbag 20 and the second airbag 22 are in the inflated position.

The second airbag 22 acts as a reaction surface for the first airbag 20 in the event of an impact to the vehicle 12. The second airbag 22 may limit rotation of the first airbag 20 by supporting around the first airbag 20 vehicle-forward of the first airbag 20 in the event of an impact to the vehicle 12. The second airbag 22 extending annularly around the rotational axis A provides a continuous reaction surface to support the first airbag 20. In an event where the impact causes the occupant to move at an angle relative to the first airbag 20 during the impact, the second airbag 22 limits slipping of the occupant on the first airbag 20 by supporting the first airbag 20 and reducing rotation of the first airbag 20 during the impact. The second airbag 22 may provide pelvic and knee support to an occupant in the event of an impact to the vehicle 12. Since the second airbag 22 provides a reaction surface for the first airbag 20, the airbags may be used with a non-circular steering wheel 14 as discussed below.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

Figure 3:
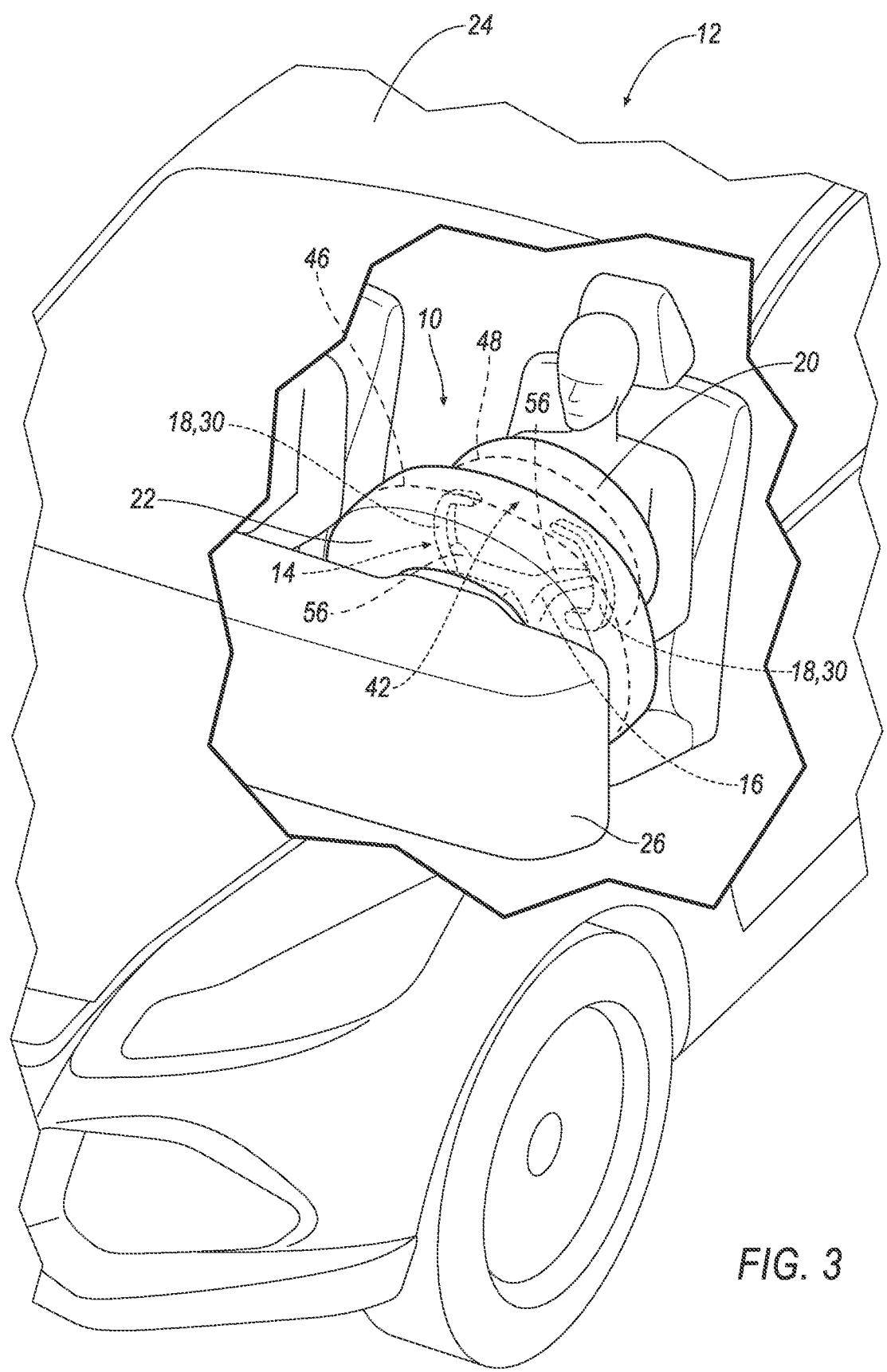
FIG. 3 is a perspective view of the vehicle including the first airbag in an inflated position and the second airbag in an inflated position.

With reference to FIGS. 1 and 3, the vehicle 12 has a passenger cabin 24 to house occupants, if any, of the vehicle 12. The passenger cabin 24 extends across the vehicle 12, i.e., from one side to the other side of the vehicle 12. The passenger cabin 24 includes a front end and a rear end with the front end being in front of the rear end during forward movement of the vehicle 12.

The vehicle 12 may include an instrument panel 26 disposed at the front end of the passenger cabin 24. The instrument panel 26 may support vehicle controls, including the steering wheel 14. The instrument panel 26 may extend across the front end of the passenger cabin 24 from one side of the vehicle 12 to the other side of the vehicle 12.

The vehicle 12 includes a steering system (not numbered). The steering system controls the turning of the wheels. The steering system is in communication with and receives input from the steering wheel 14. The steering system may include a rack-and-pinion system with electric power-assisted steering, a steer-by-wire system, as are both known in the art, or any other suitable system. The steering wheel 14 allows an operator to steer the vehicle 12 by transmitting rotation of the steering wheel 14 to movement of a steering rack. The steering system includes a steering column supporting the steering wheel 14. The steering system may include a steering column shroud 28 covering the steering column in the passenger cabin 24.

Figure 2:
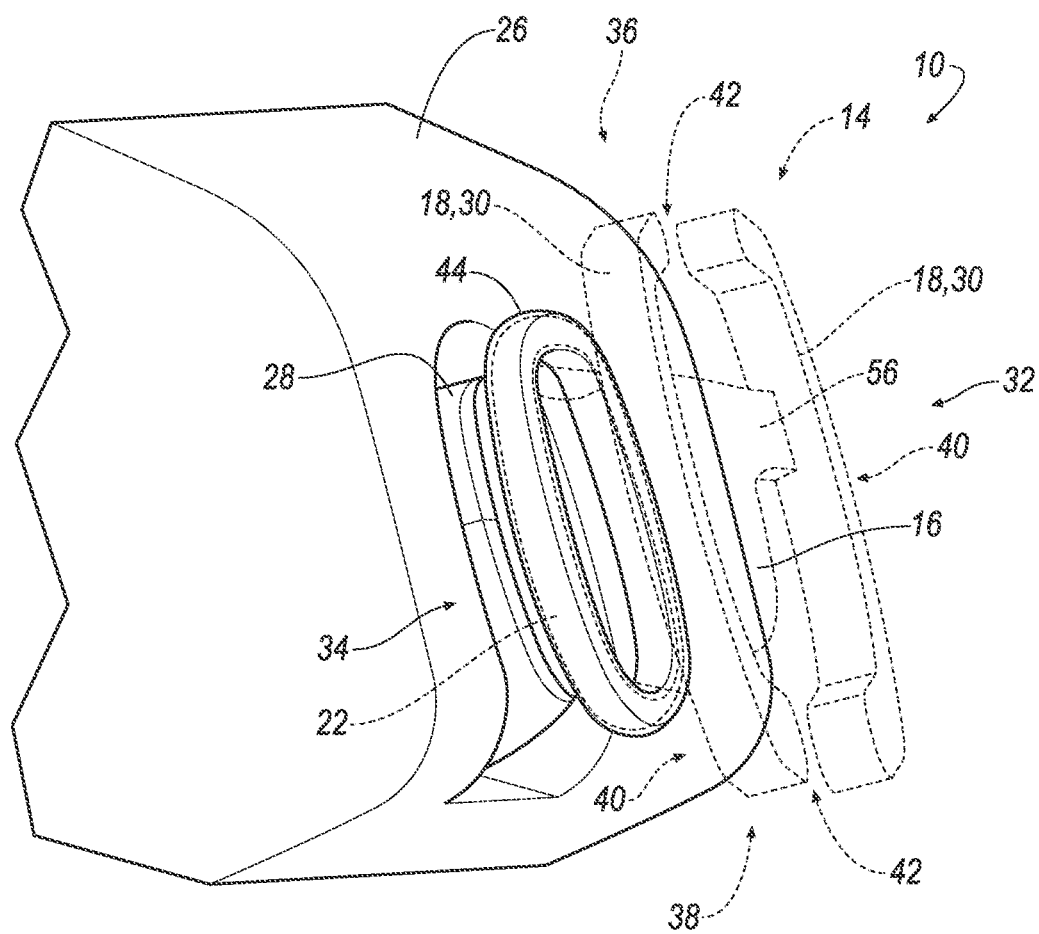
FIG. 2 is a perspective view of the steering wheel with the second airbag extending continuously around a hub of the steering wheel in the uninflated position.

With reference to FIG. 2, the steering wheel 14 includes the hub 16 rotatable about the rotational axis A. The rotational axis A generally extends in a vehicle fore-aft direction. As an operator rotates the steering wheel 14 to turn the vehicle 12, the hub 16 rotates about the rotational axis A.

The rim 18 is supported by the hub 16. The rim 18 is spaced radially from the hub 16. Specifically, the rim 18 includes an outer segment, e.g., paddles 30, spaced radially from the hub 16 with a space between the outer segment and the hub 16 so that the outer segment may be gripped by a vehicle driver. The hub 16 may be centrally disposed relative to the rim 18. Specifically, the rim 18 includes an outer surface spaced radially from the hub 16 and the outer surface may be gripped by a vehicle driver to steer the steering wheel 14 by rotating the steering wheel 14 relative to the steering column. The rim 18 may include a pair of paddles 30 that may be gripped by a driver to steer the wheel by rotating the wheel relative to the steering column. In such an example, the steering wheel 14 may include two paddles 30 spaced from each other in a cross-vehicle direction when the steering wheel 14 is steered straight.

The steering wheel 14 includes arms 56 extending from the hub 16 to the rim 18. As shown in the Figures, specifically, the steering wheel 14 includes a pair of arms 56 extending from the hub 16 to the rim 18. The arms 56 may extend from the hub 16 to the paddles 30. The steering wheel 14 may include any suitable number of arms 56 extending from the hub 16 to the rim 18. The arms 56 may extend radially outwardly relative to the rotational axis A from the hub 16 to the rim 18. When the first airbag 20 and the second airbag 22 are in the inflated position, the arms 56 are between the first airbag 20 and the second airbag 22. The first airbag 20 and the second airbag 22 may abut the arms 56 when the first airbag 20 and the second airbag 22 are in the inflated positions.

The steering wheel 14 includes a vehicle-rearward side 32 facing toward the rear end of the passenger cabin 24 and a vehicle-forward side 34 facing toward the front end of the passenger cabin 24. The rim 18 of the steering wheel 14 may be between the vehicle-rearward side 32 and the vehicle-forward side 34 of the steering wheel 14. The hub 16 may extend from the vehicle-rearward side 32 through vehicle-forward side 34.

With reference to FIGS. 1-4, the steering wheel 14 may be elongated, i.e., longer in one direction than another. In the example shown in the Figures, the steering wheel 14 may be elongated in a cross-vehicle direction when the steering wheel 14 is steered straight, i.e., when the steering wheel 14 is in an orientation such that the vehicle 12 is moving in a generally straight direction.

The steering wheel 14 may be non-circular, as shown in the Figures. Specifically, the rim 18 of the steering wheel 14 may be non-circular. In other words, the steering wheel 14, e.g., the rim 18, may be elongated in one direction. In examples in which the rim 18 is oblong, the rim 18 may be oval, rectangular, rounded rectangular, etc.

With continued reference to FIGS. 1-4, the steering wheel 14, e.g., the rim 18, includes a top 36, a bottom 38 spaced from the top 36, and two sides 40 spaced from each other and each extending from the top 36 to the bottom 38. Specifically, the rim 18 may define the top 36, bottom 38, and sides 40 of the steering wheel 14. The top 36 of the steering wheel 14 is above the bottom 38 of the steering wheel 14 when the steering wheel 14 is steered straight.

In the example shown in the figures, the paddles 30 may be separated by a gap 42. The gap 42 may be positioned at the top 36 of the steering wheel 14 and/or at the bottom 38 of the steering wheel 14. The gaps 42 may be elongated in the cross-vehicle direction. In the example shown in the Figures, the rim 18 includes one gap 42 at the top 36, one gap 42 at the bottom 38, and two paddles 30 at the sides 40, respectively. In another example, the rim 18 may be endless, i.e., the paddles 30 may be connected to each other by a portion of the rim 18 extending along the top 36 and the bottom 38 of the steering wheel 14.

With reference to FIG. 2, the assembly 10 may include a first airbag assembly (not numbered) supported by the hub 16 of the steering wheel 14. The first airbag assembly includes the first airbag 20 and may include a housing (not numbered). The first airbag 20 may be inflatable from the uninflated position to the inflated position. The housing may provide a reaction surface for the first airbag 20 in the inflated position. The housing of the first airbag assembly is supported by the steering wheel 14. Specifically, the housing is supported by the hub 16 of the steering wheel 14 and the first airbag 20 is supported by the hub 16 through the housing. The housing may be of any material, e.g., a rigid polymer, a metal, a composite, etc.

With continued reference to FIG. 2, the assembly 10 may include a second airbag assembly (not numbered) including the second airbag 22. The second airbag assembly may be supported by the hub 16 of the steering wheel 14. In another example, the second airbag assembly may be supported by the steering column shroud 28. The second airbag 22 may be inflatable from the uninflated position to the inflated position.

The assembly 10 may include at least one inflator. In one example, the assembly 10 includes two inflators, specifically, a first inflator 52 and a second inflator 54. In such an example, the first airbag assembly may include the first inflator 52 and the second airbag assembly may include the second inflator 54. The first inflator 52 and the second inflator 54 are independently operable from each other. The first inflator 52 inflates the first airbag 20 from the uninflated position to the inflated position. The second inflator 54 inflates the second airbag 22 from the uninflated position to the inflated position. In another example, the first airbag assembly and the second airbag assembly may include a single inflator to inflate both the first airbag 20 from the uninflated position to the inflated position and the second airbag 22 from the uninflated position to the inflated position.

In either example discussed above, the inflator(s) 52, 54 is/are in fluid communication with the first airbag 20 and/or the second airbag 22. The inflator(s) 52, 54 expand(s) the first airbag 20 and the second airbag 22 with an inflation medium, such as a gas, to move the first airbag 20 and the second airbag 22 from the uninflated position to the inflated position. The inflator(s) 52, 54 may be supported by any suitable component. For example, the inflator(s) 52, 54 may be supported by the hub 16 of the steering wheel 14. The inflator(s) 52, 54 may be, for example, a pyrotechnic inflator that ignites a chemical reaction to generate the inflation medium, stored gas inflators that release (e.g., by a pyrotechnic valve) stored gas as the inflation medium, or a hybrid.

The first airbag 20 and the second airbag 22 may be fluidly isolated from each other, i.e., the first airbag 20 and the second airbag 22 are not in fluid communication with each other. Inflation medium from the first airbag 20 does not pass to or inflate the second airbag 22 and inflation medium from the second airbag 22 does not pass to or inflate the first airbag 20. The inflator(s) 52, 54 is/are only in fluid communication with the first airbag 20 and the second airbag 22 to inflate the first airbag 20 and the second airbag 22 from the uninflated position to the inflated position.

The second airbag assembly may include a trim panel 44. Specifically, in the example in which the second airbag assembly is supported by the hub 16, the trim panel 44 may be supported by the hub 16 of the steering wheel 14. In such an example, the trim panel 44 may be releasable from the hub 16 to allow the second airbag 22 to inflate to the inflated position. In one example, the trim panel 44 may release to allow the airbag to inflate to the inflated position. In another example, the trim panel 44 may include a tear seam that releases to allow the airbag to inflate to the inflated position. The trim panel 44 may release in any suitable manner to allow the second airbag 22 to inflate to the inflated position. The trim panel 44 may extend endlessly around the rotational axis A to conceal the entirety of the second airbag 22.

The first airbag 20 and the second airbag 22 may be a common type of material. The first airbag 20 and second airbag 22 may be a woven polymer or any other material. As one example, the airbag may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first airbag 20 is supported by the hub 16 of the steering wheel 14. The first airbag 20 may be referred to as a driver airbag. Specifically, the first airbag 20 may be supported on the vehicle-rearward side 32 of the steering wheel 14, i.e., the first airbag 20 is supported by the hub 16 on the vehicle-rearward side 32 of the steering wheel 14. As a driver turns the steering wheel 14 about the rotational axis A to turn the vehicle, the first airbag 20 rotates about the rotational axis A along with the steering wheel 14.

With reference to FIG. 3, the first airbag 20 may be inflatable along the rotational axis A toward the rear end of the passenger cabin 24, i.e., the first airbag 20 may extend into the passenger cabin 24 toward a driver seat when the first airbag 20 is in the inflated position. When the first airbag 20 inflates to the inflated position, the first airbag 20 extends radially from the rotational axis A. The first airbag 20 may extend radially outwardly relative to the rotational axis A farther than the rim 18 of the steering wheel 14 extends radially outwardly relative to the rotational axis A when the first airbag 20 is in the inflated position.

Figure 5:
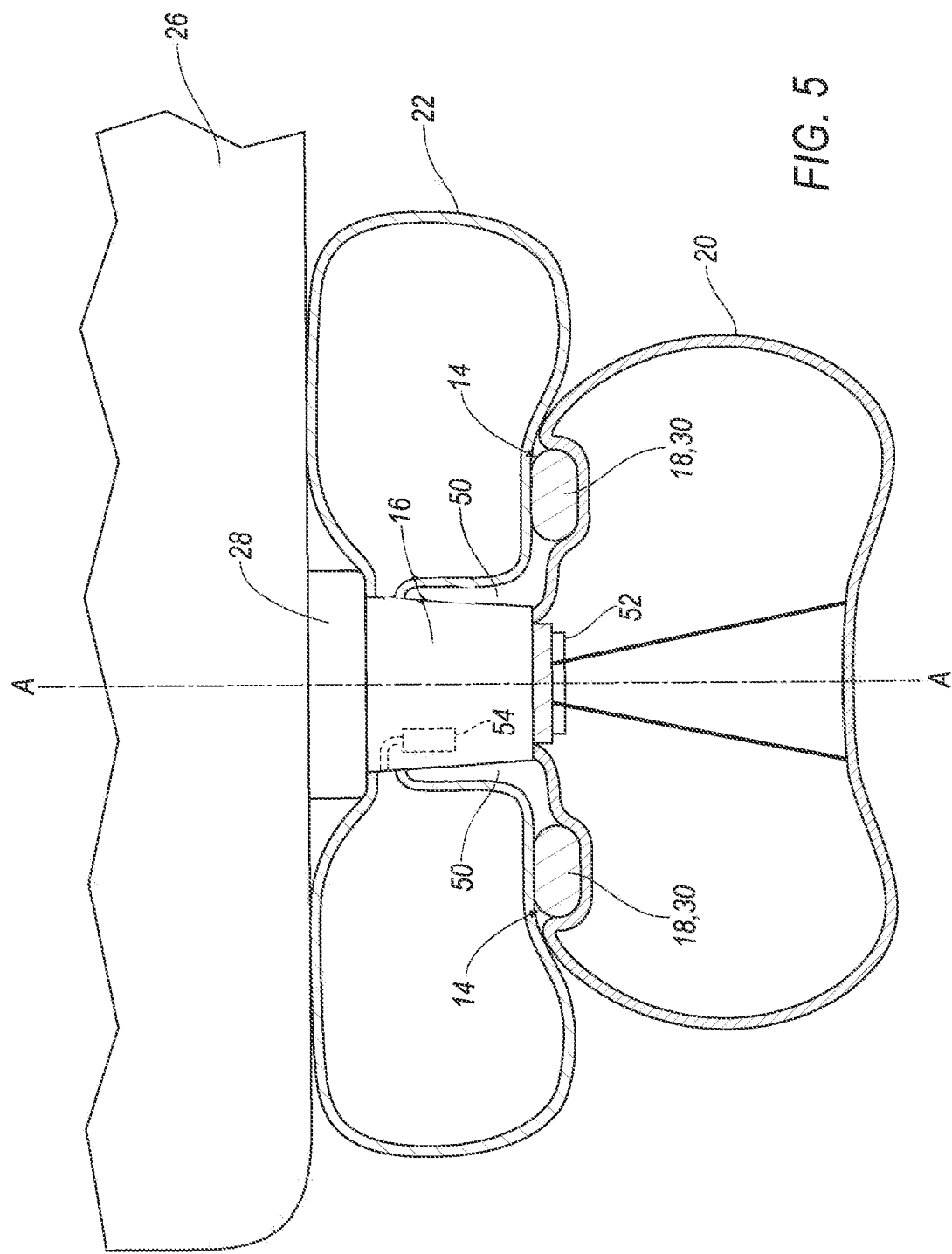
FIG. 5 is a cross-sectional view through line 5 of FIG. 4.
Figure 6:
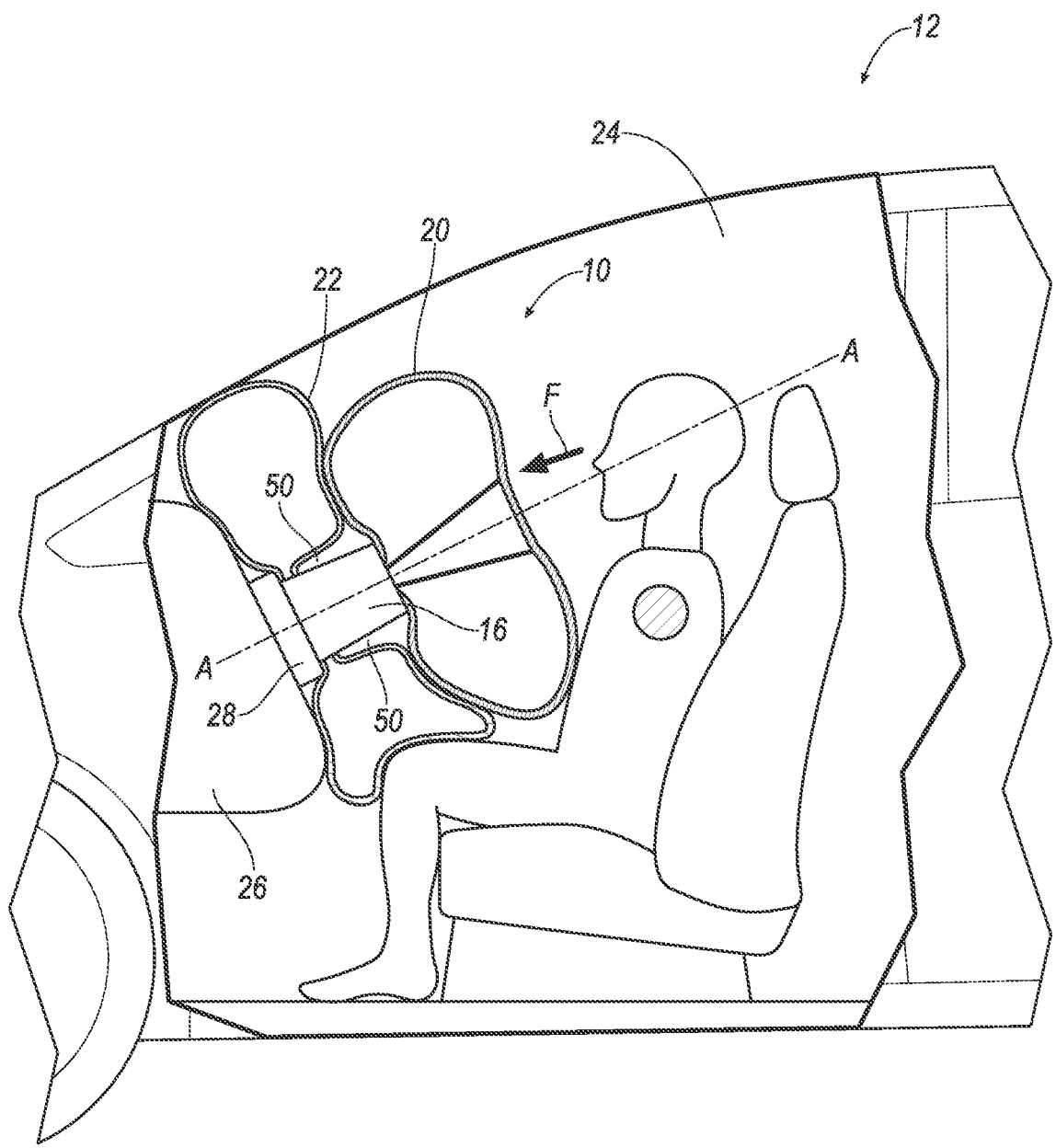
FIG. 6 is a cross-sectional view through line 6 of FIG. 4.

With reference to FIGS. 5 and 6, the second airbag 22 may be supported on the vehicle-forward side 34 of the steering wheel 14. As in the example shown in the Figures, the second airbag 22 may be supported by the hub 16 on the vehicle-forward side 34 of the steering wheel 14. In other words, as a driver may turn the steering wheel 14 to turn the vehicle, the second airbag 22 rotates about the rotational axis A with the hub 16 as the steering wheel 14 turns. In another example, the second airbag 22 may be supported on the steering column shroud 28. In such an example, the second airbag 22 does not turn as a driver turns the steering wheel 14.

Figure 4:
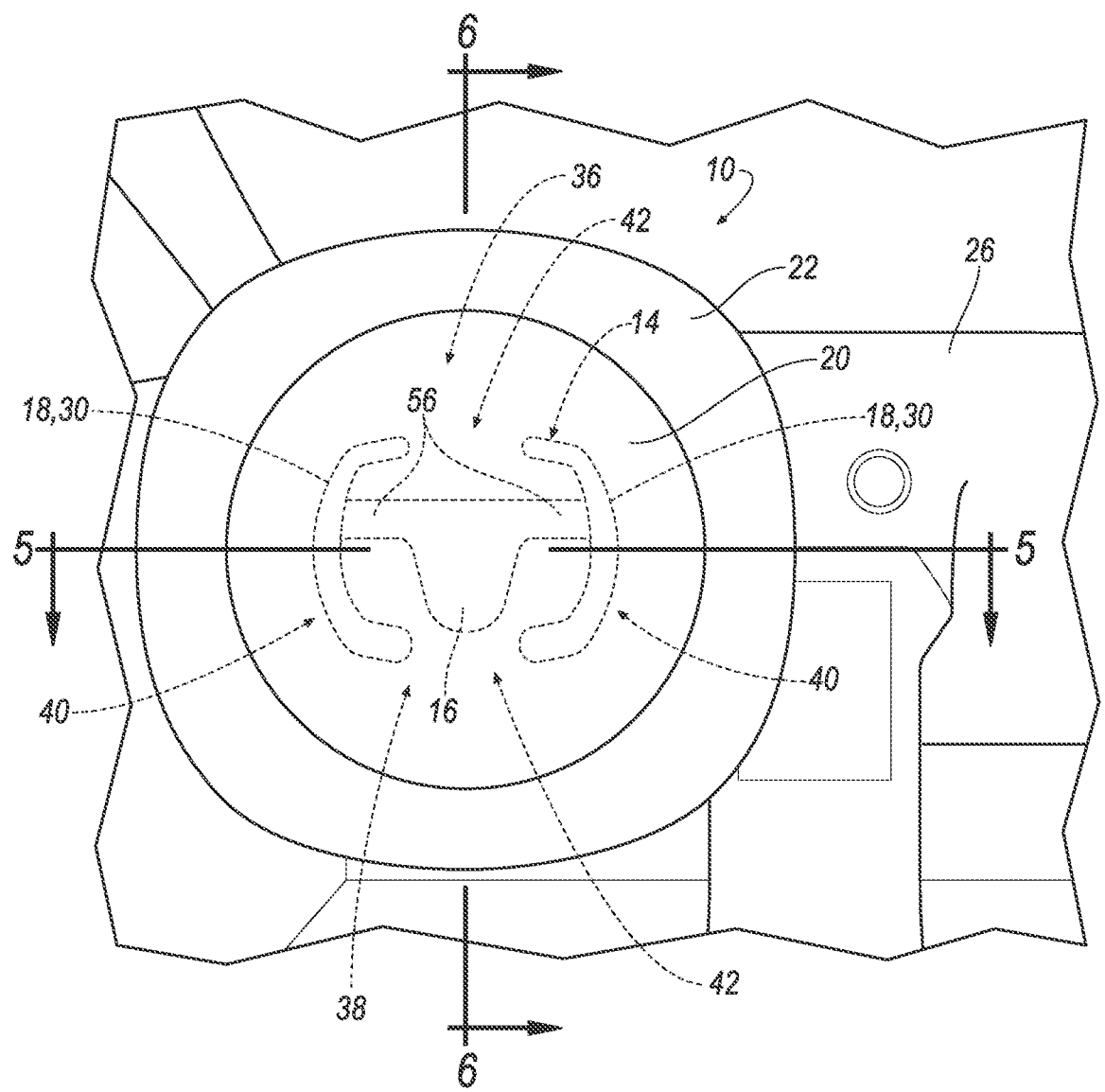
FIG. 4 is a front view of the steering wheel with the first airbag and the second airbag in the inflated position.

With reference to FIGS. 2 and 4, both in the uninflated position and the inflated position, the second airbag 22 is annular. Specifically, the second airbag 22 extends annularly around the rotational axis A, i.e., the second airbag 22 extends in an endless ring around the rotational axis A. The annular shape of the second airbag 22 may be coaxial with the rotational axis A or may be offset from the rotational axis A. In any event, the annular shape of the second airbag 22 includes an inner diameter, e.g., defined by the hub 16 in the example shown in the Figures, and the rotational axis A extends through the inner diameter. The second airbag 22 extends endlessly around the component that supports the second airbag 22, e.g., the hub 16 as shown in the Figures.

With reference to FIG. 3, the second airbag 22 and the first airbag 20 may be spaced from each other along the rotational axis A when the first airbag 20 and the second airbag 22 are in the uninflated position. In the uninflated position, other components of the vehicle 12 may be between the first airbag 20 and the second airbag 22. The second airbag 22 may be vehicle-forward of the first airbag 20, i.e., the second airbag 22 is spaced vehicle-forward from the first airbag 20 along the rotational axis A.

With reference to FIG. 4, in the inflated position, the second airbag 22 extends radially outward relative to the rotational axis A. In the example shown in FIG. 4, the second airbag 22 extends radially from the hub 16 in the inflated position. In examples in which the second airbag 22 is supported by a component other than the hub 16, the second airbag 22 extends radially away from component that supports the second airbag 22 in the uninflated position.

The second airbag 22 may extend radially outward relative to the rotational axis A farther than the rim 18 of the steering wheel 14 extends radially outward relative to the rotational axis A when the second airbag 22 is in the inflated position. As shown in FIG. 4, a circumference 46 of the second airbag 22 that is radially spaced from the rotational axis A is farther from the rotational axis A than the rim 18 of the steering wheel 14. The second airbag 22 may be configured to extend into a knee area of the passenger cabin 24 in the inflated position, as shown in FIG. 6. In other words, the second airbag 22 is sized and shaped to extend between the instrument panel and a seat bottom of the driver seat to the area occupied by the knees of the occupant of the driver seat. Specifically, the circumference 46 in the inflated position may be sized and positioned to impact the knee of the occupant to provide support for the knee of the occupant in the event of an impact to the vehicle 12. In addition, the circumference 46 in the inflated position may be sized and positioned to impact the pelvic area of the occupant to provide support for the pelvic area of the occupant.

When the first airbag 20 is in the inflated position and the second airbag 22 is in the inflated position, the second airbag 22 may extend radially from the rotational axis A farther than the first airbag 20 extends radially outward relative to the rotational axis A. Specifically, the circumference 46 of the second airbag 22 is radially spaced from the rotational axis A farther than a circumference 48 of the first airbag 20 is radially spaced from the rotational axis A. In other words, as shown in FIG. 4, the circumference 46 of the second airbag 22 is larger than the circumference 48 of the first airbag 20, as shown from a front view of the steering wheel 14. The first airbag 20 may use the second airbag 22 as a reaction surface in the inflated position. With the second airbag 22 extending farther than the first airbag 20 in the inflated position, the second airbag 22 provides a large reaction surface and limits rotation of the first airbag 20 in the event the first airbag 20 is impacted by the occupant. By extending farther than the first airbag 20 radially relative to the rotational axis A, the second airbag 22 may extend to the pelvic area and knee of the occupant to support the occupant in the event of an impact to the vehicle 12 and the first airbag 20 may be spaced from the pelvic area and the knees. Specifically, the head and/or chest of the occupant may impact the first airbag 20 and the knees and/or pelvic area of the occupant may impact the second airbag 22. The second airbag 22 may resist forward movement of the occupant by impacting the knees and/or pelvic area of the occupant.

With reference to FIGS. 5 and 6, in the inflated position, the rim 18 of the steering wheel 14 is between the first airbag 20 and the second airbag 22. Specifically, when the first airbag 20 and the second airbag 22 are both in the inflated position, the first airbag 20 and the second airbag 22 abut the rim 18. In other words, in the inflated position, the first airbag 20 and the second airbag 22 may contact the rim 18 of the steering wheel 14. In the inflated position, the first airbag 20 and the second airbag 22 may abut the paddles 30 of the rim 18, i.e., the paddles 30 are between the first airbag 20 and the second airbag 22.

With continued reference to FIGS. 5 and 6, when the first airbag 20 and the second airbag 22 are in the inflated position, the first airbag 20 and the second airbag 22 abut each other. In other words, the first airbag 20 contacts the second airbag 22 when the first airbag 20 is in the inflated position and the second airbag 22 is in the inflated position. When the first airbag 20 and the second airbag 22 are each in the inflated position, the second airbag 22 provides support to the first airbag 20. The contact between the first airbag 20 and the second airbag 22 allows the first airbag 20 to use the second airbag 22 as a reaction surface in the event of an impact to the vehicle 12. With the contact between the first airbag 20 and the second airbag 22 and the second airbag 22 extending radially from the rotational axis A farther than the first airbag 20 extends radially relative to the rotational axis A, the second airbag 22 may limit rotation of the first airbag 20 in the inflated position to control kinematics of an occupant in the event of an impact to the vehicle 12.

With reference to FIG. 6, in the inflated position, the first airbag 20 and the second airbag 22 abut each other in the gap 42 between the paddles 30 of the rim 18. With the rim 18 of the steering wheel 14 including a gap 42 between the paddles 30 of the rim 18, the second airbag 22 provides support to the first airbag 20 in the gap 42 between the paddles 30 by contacting the first airbag 20 in the gap 42. The first airbag 20 and the second airbag 22 abut each other in the gap 42 at the top 36 of the rim 18 of the steering wheel 14 and in the gap 42 at the bottom 38 of the rim 18 of the steering wheel 14 to support the first airbag 20 at the top 36 and the bottom 38 of the steering wheel 14. The second airbag 22 provides a reaction surface for the first airbag 20 in the inflated position in the gap 42 between the paddles 30 by contacting and supporting the first airbag 20 in the gap 42 and/or gaps 42 between the paddles 30 of the rim 18. The second airbag 22 contacting the first airbag 20 in the gap 42 limits rotation of the first airbag 20 at the top 36 and/or the bottom 38 of the steering wheel 14.

With reference to FIGS. 4-6, in the uninflated position and the inflated position, the second airbag 22 is between the instrument panel 26 and the first airbag 20. The instrument panel 26 is vehicle-forward of the second airbag 22 and the first airbag 20 is vehicle-rearward of the second airbag 22.

In the uninflated position and the inflated position, the second airbag 22 is between the rim 18 of the steering wheel 14 and the instrument panel 26. Other components in the vehicle 12 may be between the second airbag 22 and the rim 18 and between the second airbag 22 and the instrument panel 26 when the second airbag 22 is in the uninflated position and the inflated position. In the uninflated position, the second airbag 22 is spaced from the rim 18 of the steering wheel 14 along the rotational axis A and spaced from the instrument panel 26 along the rotational axis A.

In the inflated position, the second airbag 22 may abut the instrument panel 26. In other words, the second airbag 22 may contact the instrument panel 26 when the second airbag 22 is in the inflated position. In such an example, the second airbag 22 uses the instrument panel 26 as a reaction surface in the inflated position to support the first airbag 20 in the event of an impact to the vehicle 12. The instrument panel 26 provides support to the second airbag 22 such that the second airbag 22 provides support to the first airbag 20. The instrument panel 26 limits rotation of the second airbag 22 as the first airbag 20 uses the second airbag 22 as a reaction surface.

The second airbag 22 may extend from the rim 18 of the steering wheel 14 to the instrument panel 26 in the inflated position. Specifically, the second airbag 22 may have a thickness between the rim 18 of the steering wheel 14 and the instrument panel 26 that extends from the rim 18 of the steering wheel 14 to the instrument panel 26 when the second airbag 22 is in the inflated position. The second airbag 22 may be elongated along the rotational axis A between the rim 18 of the steering wheel 14 and the instrument panel 26 in the inflated position. As discussed above, the second airbag 22 extends continuously around the rotational axis A.

When the second airbag 22 is in the inflated position, the second airbag 22 may abut the rim 18 of the steering wheel 14, the instrument panel 26, and the first airbag 20. As discussed above, the second airbag 22 acts a reaction surface for the first airbag 20 when the first airbag 20 and the second airbag 22 are each in the inflated position. The second airbag 22 provides support for the first airbag 20 when the first airbag 20 is in the inflated position by contacting the instrument panel 26 and using the instrument panel 26 as a reaction surface.

With reference to FIGS. 5 and 6, in the inflated position, a portion of the second airbag 22 may be spaced from the hub 16. Specifically, the second airbag 22 may include a generally cylindrical cavity 50 extending from the hub 16 to the second airbag 22. As in the example shown in the Figures, the cavity 50 may extend along the hub 16 of the steering wheel 14 to the first airbag 20. In another example, the cavity 50 may extend along the hub 16 to the steering column shroud 28. In yet another example, the second airbag 22 may include a combination of the examples discussed above. In other words, the second airbag 22 may include a generally cylindrical cavity 50 extending along the hub 16 to the first airbag 20 and a second generally cylindrical cavity 50 extending along the hub 16 to the steering column shroud 28.

The vehicle 12 includes impact sensors (not shown) that may become activated in the event of an impact to the vehicle 12. The impact sensors are in communication with a controller, e.g., a vehicle computer. The impact sensor is programmed to detect an impact to the vehicle 12. The impact sensor may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor may be located at numerous points in or on the vehicle 12.

The vehicle computer, implemented via circuits, chips, or other electronic components, is included in the vehicle control system for carrying out various operations, including as described herein. The vehicle computer is a computing device that generally includes a processor and a memory, the memory including one or more forms of computer-readable media, and storing instructions executable by the processor for performing various operations, including as disclosed herein. The memory of the vehicle computer further generally stores remote data received via various communications mechanisms; e.g., the vehicle computer is generally configured for communications on a controller area network (CAN) bus or the like, and/or for using other wired or wireless protocols, e.g., Bluetooth, etc. The vehicle computer may also have a connection to an onboard diagnostics connector (OBD-II). Via a communication network using Ethernet, WiFi, the CAN bus, Local Interconnect Network (LIN), and/or other wired or wireless mechanisms, the vehicle computer may transmit messages to various devices in the vehicle and/or receive messages from the various devices, e.g., controllers, actuators, sensors, etc., e.g., controllers and sensors as discussed herein. For example, the vehicle computer may receive data from vehicle sensors. It is to be understood that the vehicle computer could include, and various operations described herein could be carried out by, one or more computing devices.

In the event of an impact, the impact sensors may detect the impact and transmit a signal through the communications network to the vehicle computer. The vehicle computer may transmit a signal through the communications network to the inflator(s) 52, 54. The inflator(s) 52, 54 may activate and inflate the first airbag 20 and the second airbag 22. The first airbag 20 and the second airbag 22 may inflate simultaneously. Specifically, the first airbag 20 may be in the inflated position when the second airbag 22 may be in the inflated position. The second airbag 22 acts as a reaction surface for the first airbag 20 with the second airbag 22 using the instrument panel 26 as a reaction surface. The second airbag 22 allows the first airbag 20 to control the kinematics of an occupant in the event of an impact to the vehicle 12 by providing support to the first airbag 20 and limiting rotation of the first airbag 20. The second airbag 22 may provide support to the pelvic area and the knee of the occupant in the event of an impact to the vehicle 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
    a steering wheel having a hub rotatable about a rotational axis and a rim spaced radially from the hub;
    a first airbag supported by the hub and inflatable from an uninflated position to an inflated position; and
    a second airbag inflatable from an uninflated position to an inflated position, the second airbag being annular around the rotational axis in the inflated position;
    the first airbag and the second airbag being spaced from each other along the rotational axis when the first airbag and the second airbag are in the uninflated position; and
    the rim being between the first airbag and the second airbag when the first airbag and the second airbag are in the inflated position;
    the first airbag including a vehicle-forward panel that abuts a vehicle-rearward panel of the second airbag and the first airbag extending vehicle-rearward of the vehicle-rearward panel of the second airbag when the first airbag and second airbag are inflated;
    the vehicle-forward panel of the first airbag and the vehicle-rearward panel of the second airbag abutting the rim of the steering wheel; and
    the vehicle-forward panel of the first airbag abutting the vehicle-rearward panel of the second airbag radially outwardly from the rim of the steering wheel.

2. The assembly of claim 1, wherein the second airbag is supported by the hub.

3. The assembly of claim 1, wherein the second airbag is vehicle-forward of the first airbag.

4. The assembly of claim 1, wherein the first airbag and the second airbag are fluidly isolated from each other.

5. The assembly of claim 1, wherein the second airbag extends radially outward relative to the rotational axis farther than the first airbag in the inflated position.

6. The assembly of claim 1, further comprising an instrument panel, the second airbag being between the instrument panel and the first airbag.

7. The assembly of claim 6, wherein the second airbag abuts the instrument panel when the second airbag is in the inflated position.

8. The assembly of claim 1, wherein the rim of the steering wheel is non-circular.

9. The assembly of claim 1, wherein the rim includes a pair of paddles separated by a gap, the first airbag and the second airbag abutting each other in the gap when the first airbag and the second airbag are in the inflated position.

10. The assembly of claim 9, further comprising an instrument panel, the second airbag, when the first airbag and the second airbag are in the inflated position, being between the instrument panel and the first airbag and abutting the instrument panel.

11. The assembly of claim 1, wherein the second airbag includes a generally cylindrical cavity extending from the hub to the second airbag.

12. The assembly of claim 1, further comprising a pair of arms extending from the hub to the rim, the arms being between the first airbag and the second airbag when the first airbag and the second airbag are in the inflated position.

13. The assembly of claim 1, wherein the second airbag is configured to extend into a knee area of a passenger cabin in the inflated position.

14. The assembly of claim 1, wherein the rim includes a pair of paddles separated by a gap, the vehicle-forward panel of the first airbag abutting the vehicle-rearward panel of the second airbag in the gap when the first airbag and the second airbag are in the inflated position.

* * * * *